(12) United States Patent
Buhr

(10) Patent No.: US 8,155,309 B2
(45) Date of Patent: *Apr. 10, 2012

(54) CIRCUIT ARRANGEMENT WITH NON-VOLATILE MEMORY MODULE AND METHOD FOR EN-/DECRYPTING DATA IN THE NON-VOLATILE MEMORY MODULE

(75) Inventor: Wolfgang Buhr, Hamburg (DE)

(73) Assignee: Eliposki Remote Ltd., L.L.C., Wilmington, DE (US)

( * ) Notice: Subject to any disclaimer, the term of this patent is extended or adjusted under 35 U.S.C. 154(b) by 793 days.

This patent is subject to a terminal disclaimer.

(21) Appl. No.: 12/125,737

(22) Filed: May 22, 2008

(65) Prior Publication Data

US 2009/0132831 A1    May 21, 2009

Related U.S. Application Data

(63) Continuation of application No. 10/535,370, filed as application No. PCT/IB03/05209 on Nov. 14, 2003, now Pat. No. 7,395,165.

(30) Foreign Application Priority Data

Nov. 21, 2002 (DE) .................................. 10254320

(51) Int. Cl.
*G06F 21/00* (2006.01)
(52) U.S. Cl. ............. 380/42; 713/193; 380/45; 380/228
(58) Field of Classification Search .................... 380/42; 713/193
See application file for complete search history.

(56) References Cited

U.S. PATENT DOCUMENTS

| | | | | |
|---|---|---|---|---|
| 4,319,079 A | * | 3/1982 | Best | 713/190 |
| 5,063,596 A | * | 11/1991 | Dyke | 713/192 |
| 5,293,424 A | | 3/1994 | Holtey et al. | |
| 6,006,190 A | | 12/1999 | Baena-Arnaiz et al. | |
| 6,289,455 B1 | * | 9/2001 | Kocher et al. | 713/194 |
| 6,473,861 B1 | * | 10/2002 | Stokes | 713/193 |
| 7,039,816 B2 | | 5/2006 | Kocher et al. | |
| 7,107,458 B2 | | 9/2006 | Oishi et al. | |
| 7,203,841 B2 | | 4/2007 | Jackson et al. | |
| 2001/0015919 A1 | | 8/2001 | Kean | |
| 2002/0094087 A1 | * | 7/2002 | Dellmo et al. | 380/270 |
| 2002/0099948 A1 | | 7/2002 | Kocher et al. | |

(Continued)

FOREIGN PATENT DOCUMENTS

EP      0330404      8/1989

(Continued)

OTHER PUBLICATIONS

Communication from the European Patent Office issued on European Patent Application 03811456.7, dated Mar. 18, 2009.
Final Office Action on U.S. Appl. No. 10/535,370, mailed May 17, 2007.

(Continued)

*Primary Examiner* — Taghi Arani
*Assistant Examiner* — Mohammad Rahman

(57) ABSTRACT

An apparatus and method is provided for protecting data in a non-volatile memory by using an encryption and decryption that encrypts and decrypts the address and the data stored in the non-volatile memory using a code read only memory that stores encryption and decryption keys that are addressed by a related central processing unit at the same time data is being written or read from the non-volatile memory by the central processing unit.

21 Claims, 1 Drawing Sheet

U.S. PATENT DOCUMENTS

| | | | |
|---|---|---|---|
| 2003/0044018 A1* | 3/2003 | Tomlinson | 380/277 |
| 2003/0098775 A1* | 5/2003 | Hazard | 340/5.8 |
| 2003/0135743 A1* | 7/2003 | Scheuermann | 713/189 |
| 2004/0030907 A1* | 2/2004 | Dariel | 713/189 |
| 2005/0088379 A1 | 4/2005 | Denison | |

FOREIGN PATENT DOCUMENTS

| | | |
|---|---|---|
| EP | 1022659 | 7/2000 |
| JP | 02-005158 | 1/1990 |
| JP | 2000-235523 | 8/2000 |

OTHER PUBLICATIONS

International Search Report for PCT/IB03/05209, mailed Jan. 4, 2005.

Non-Final Office Action on U.S. Appl. No. 10/535,370, mailed Oct. 9, 2007.

Non-Final Office Action on U.S. Appl. No. 10/535,370, mailed May 3, 2006.

Notice of Allowance on U.S. Appl. No. 10/535,370, mailed Feb. 28, 2008.

* cited by examiner

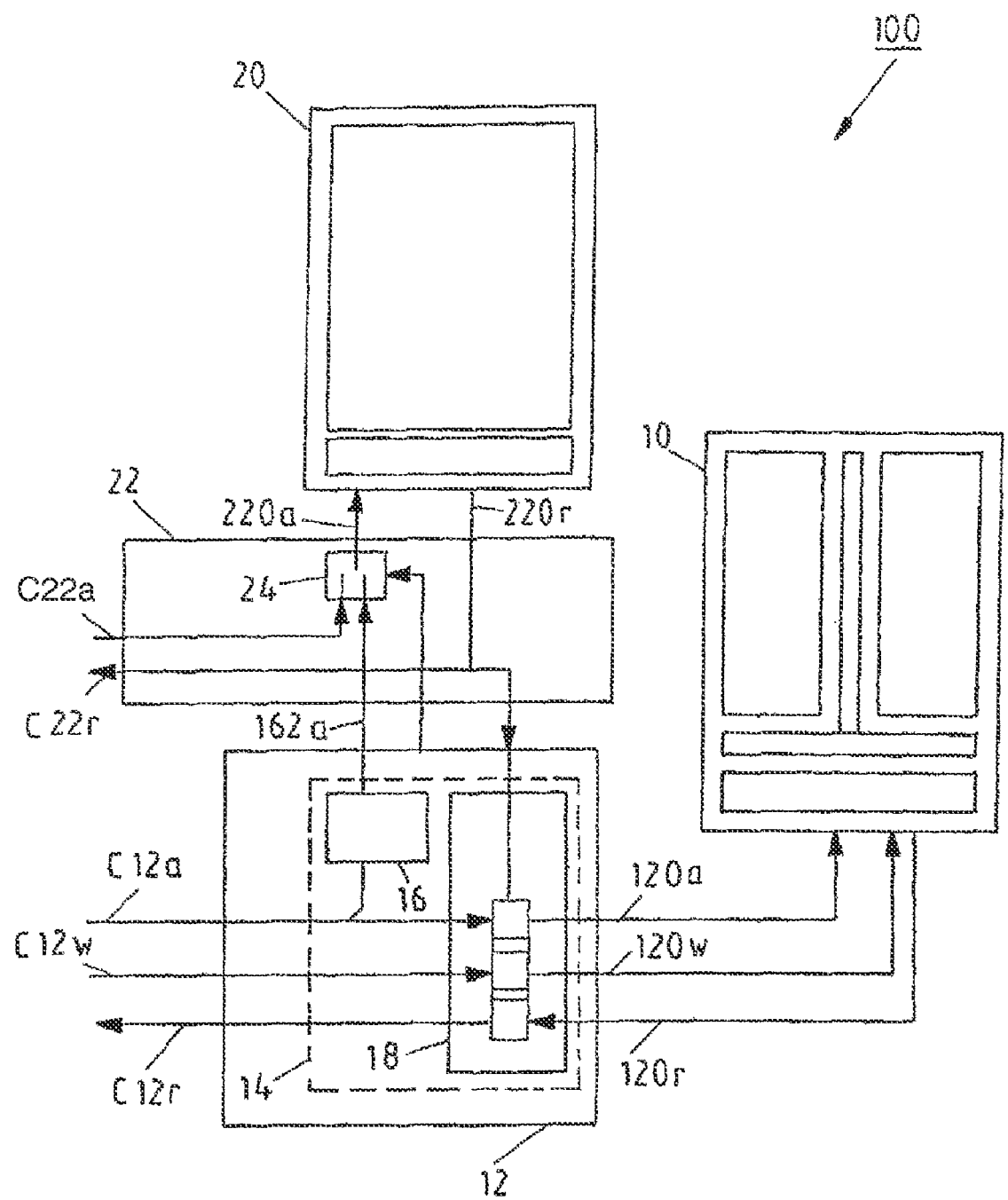

CIRCUIT ARRANGEMENT WITH NON-VOLATILE MEMORY MODULE AND METHOD FOR EN-/DECRYPTING DATA IN THE NON-VOLATILE MEMORY MODULE

RELATED PATENT DOCUMENTS

This application is a continuation under 35 U.S.C. §120 of application Ser. No. 10/535,370 filed on May 18, 2005, which is a 35 U.S.C §371 national stage entry of International Application No. PCT/IB2003/005209 filed on Nov. 14, 2003, which claims priority benefit under 35 U.S.C. §119 of German Patent Application No. 10254320.8 filed on Nov. 21, 2002, to which priority is also claimed here.

BACKGROUND OF THE INVENTION

The present invention relates to a circuit arrangement for electronic data processing
  having at least one non-volatile memory module for storing data to be protected against unauthorized access by means of en-/decryption;
  having at least one memory module interface logic circuit assigned to the memory module
    for addressing the memory module,
    for writing the data to the memory module and for reading the data from the memory module;
  having at least one code ROM module interface logic circuit assigned to the code ROM module
    for addressing the code ROM module and
    for reading the ROM code from the code ROM module.
The present invention further relates to a method of en-/decrypting data to be protected against unauthorized access in at least one non-volatile memory module.

DESCRIPTION OF RELATED ART

Conventionally, key codes necessary for encrypting or decrypting the contents of a Non-Volatile (NV) memory module are either hard-coded, defined by means of fuse cells especially instantiated therefore or saved themselves in a specially protected area of the non-volatile memory module.

Each of these known procedures has disadvantages, however: in the case of hard-coded keys, the key code cannot be changed for different controller versions with different ROM codes; in the case of the more flexible definition of the key code in fuse cells or in the case of protected Electrical Erasable Programmable Read Only Memory (EEPROM) areas, the key length is limited as a result of cell or surface area requirements.

SUMMARY OF THE INVENTION

Taking as basis the above-described disadvantages and shortcomings and acknowledging the outlined prior art, it is an object of the present invention so to develop a circuit arrangement of the above-mentioned type and an en-/decryption method of the above-mentioned type based thereon that on the one hand the key code may be changed for different controller versions with different ROM codes and on the other hand the length of the key code is not limited.

This object is achieved with a circuit arrangement having the features indicated in FIG. 1 and by an en-/decryption method based thereon having the features discussed herein below. Advantageous embodiments and expedient further developments of the present invention are identified herein as well.

According to the teaching of the present invention, therefore, a completely new approach is disclosed to the generation of at least one especially long key for the en-/decryption of at least one NV memory module from ROM code data, for example for embedded security controllers For this en-/decryption of the NV memory module, the key code is extracted from the ROM code available to the (micro-) controller, which ROM code is a constant from the point of view of the NV memory module; in this manner, a key code is generated which, with up to one byte of key per byte of plain/cipher text, may be described as relatively long.

According to a particularly inventive further development, the key (code) may be generated
  either by reading out the ROM code from the code ROM module in parallel with writing or reading of the non-volatile memory module
  or by one-off reading out of particular ROM code bytes at the time of the so-called "reset sequence" and by storing these ROM code bytes in at least one key register, until the ROM code bytes are required for at least one write operation or read operation of the NV memory module.

According to an advantageous development of the present invention, the quality of the key code may be further improved by supplementary or additional measures, such as for example by at least one additional address dependency or by scrambling by means of at least one scrambling logic circuit, which then counteracts the relatively regular structure of ROM codes.

The above-described invention is advantageously not limited methodologically to particular en-/decryption methods, but may be adapted with regard to key length and/or with regard to quality to the respective requirements of the method used.

Through double use of the ROM code as a source for long key codes, the security of the encryption or decryption of the NV memory module is increased by greater key lengths, without such a greater key length resulting in a corresponding additional surface area requirement for storing this key code.

Furthermore, the person skilled in the art of cryptology will particularly appreciate the fact that the key codes generated according to the invention are dependent on the ROM code of the code ROM module, i.e. change with varying ROM codes.

The present invention further relates to a microcontroller, in particular an "embedded security controller", comprising at least one data processing device according to the above-described type. Accordingly, the above-described method may preferably be built into all smart card developments, for example.

The present invention finally relates to the use of at least one circuit arrangement of the above-described type in at least one chip unit, in particular in at least one "embedded security controller".

BRIEF DESCRIPTION OF THE DRAWINGS

As already discussed above, there are various possible ways of advantageously embodying and developing the teaching of the present invention. The invention will be further described with reference to examples of embodiments shown in the drawings to which, however, the invention is not restricted. In the FIGUREs:

FIG. 1 is a schematic block diagram of an example of an embodiment of a circuit arrangement according to the present invention, by means of which the en-/decryption method may be performed according to the present invention.

DETAILED DESCRIPTION OF THE EXEMPLARY EMBODIMENTS OF THE INVENTION

FIG. 1 shows an example of an embodiment of a circuit arrangement 100 for electronic data processing; in particular, the circuit arrangement 100 is provided for use in a microcontroller of the "embedded security controller" type.

This circuit arrangement 100 comprises a multi-component NV memory module 10, which takes the form of an EEPROM and by means of which data may be stored which are to be protected from unauthorized access by encryption or decryption.

Assigned to this NV memory module 10 is a memory module interface logic circuit 12, by means of which the memory module 10 may be addressed (-->reference numeral 120a: address data "ADDR(a:0)" from the memory module interface logic circuit 12 to the memory module 10), the memory module 10 may be written to (-->reference numeral 120w: signal data "DIN(d:0)" from the memory module interface logic circuit 12 to the memory module 10) and the memory module 10 may be read out (-->reference numeral 120r: signal data "DOUT(d:0)" from the memory module 10 to the memory module interface logic circuit 12).

In addition, the circuit arrangement 100 comprises a code ROM module 20 for storing and supplying ROM codes. Assigned to this code ROM module 20 is code ROM module interface logic circuit 22 by means of which the code ROM module 20 may be addressed (-->reference numeral 220a: address data "A" from the code ROM module interface logic circuit 22 to the code ROM module 20) and the code ROM module 20 may be read out (-->reference numeral 220r: ROM code data or ROM code bytes "DO" from the code ROM module 20 to the code ROM module interface logic circuit 22).

The special feature of the circuit arrangement 100 according to FIG. 1 is that the key code for encrypting or decrypting the data assigned to the memory module 10 may be extracted and generated from the ROM code of the code ROM module 20.

To this end, the memory module interface logic circuit 12 comprises an en-/decryption logic circuit 14 having a key address generation unit 16 and a key register 18. The key address generation unit 16 is provided in this context for the purpose of generating an ROM key address (→reference numeral 162a: ROM key address data from the key address generation unit 16 to a multiplexing unit 24 of the code ROM module interface logic circuit 22) in the case of write or read access to the memory module 10 using a memory module address coming from the Central Processing Unit (CPU) (→reference numeral C12a: address data "CPU NV addr" from the CPU to the memory module interface logic circuit 12).

This multiplexing unit 24 integrated into the code ROM module interface logic circuit 22 receives not only an ROM key address of the key address generation unit 16, but also the address data coming from the CPU (-->reference numeral C22a: CPU ROM address data "CPU ROM addr" from the CPU to the multiplexing unit 24 of the code ROM module interface logic circuit 22).

The ROM code is then fetched from the code ROM module 20 by means of the ROM key address and used as an en-/decryption key for encryption or decryption of the address data "CPU NV addr" from the CPU via the memory module interface logic circuit 12 to the memory module 10 (-->reference numeral C12a), the signal data "CPU NV write data" from the CPU via the memory module interface logic circuit 12 to the memory module 10 (-->reference numeral C12w) and the signal data "CPU NV read data" from the memory module 10 via the memory module interface logic circuit 12 to the CPU (-->reference numeral C12r).

The nub of the present invention is therefore that the circuit arrangement 100 according to FIG. 1 allows a method for encrypting or decrypting data to be protected against unauthorized access in the non-volatile memory module 10 to be performed, wherein the data assigned to the memory module 10 are encrypted or decrypted by means of the ROM code supplied by the code ROM module 20.

The quality of the key code generated may be further improved by scrambling by means of a scrambling logic circuit known per se (c.f. prior art DE 199 01 829 A1) but not shown explicitly in FIG. 1 for reasons of clarity, which then counteracts the relatively regular structure of the ROM code supplied by the code ROM module 20.

This scrambling logic circuit comprises a permutation stage for permuting bits of different value of the address signals "ADDR(a:0)" and/or data signals "DIN(d:0)" or "DOUT(d:0)" supplied to the scrambling logic circuit, an inversion stage for inverting the values of the bits of the address signals "ADDR(a:0)" and/or data signals "DIN(d:0)" or "DOUT(d:0)", wherein the permutation stage and the inversion stage are controlled by the scrambling pattern signals, and a decoding stage for obtaining control signals for the permutation stage and the inversion stage from the scrambling pattern signals.

With regard to generation of the key code serving in encryption or decryption, a distinction is drawn according to the present invention in principle between two variants (i) and (ii):

(i) generation of the key code in parallel with NV memory access, i.e. by reading out the ROM code in parallel with write/read access to the memory module 10:

Here, the en-/decryption logic circuit 14 in the respective interface (=memory module interface logic circuit 12) of the NV memory 10 obtains direct access to the unencrypted output data 220r of the code ROM module 20. In parallel with each write access (-->reference numeral 120w) to the NV memory 10 or with each read access (-->reference numeral 120r) to the page register of the NV memory 10, one byte of the ROM code is also read out from the code ROM module 20. The ROM code address 220a from which reading is performed is determined by the key address generation unit 16 of the en-/decryption logic circuit 14 but has to be unambiguous and reproducible for each NV memory address 120a.

For encryption (in the event of write access, reference numeral 120w) or decryption (in the event of read access, reference numeral 120r) of the NV memory data "DIN(d:0)" or "DOUT(d:0)", this ROM code byte is then used as a key byte or as part of the key byte, such that in an extreme case a key space is produced which is of exactly the same size as the code space of the NV memory module 10.

(ii) Generation of the key code in the reset phase, i.e. by one of reading out of particular ROM code bytes, in particular at the time of the reset sequence, and by storing these ROM code bytes in the key register 18 until the time of a write/read access to the memory module 10, i.e. until these ROM code bytes are required for a write operation or a read operation of the memory module 10:

As a part of the "reset sequence" of the controller, a number of ROM code bytes are read out from the code ROM module 20 and stored in the key registers 18.

In the event of write or read access to the memory module 10, the content of these key registers 18 is used as the key or as parts of the key for encrypting or decrypting the NV memory data "DIN(d:0)" or "DOUT(d:0)" respectively.

LIST OF REFERENCE NUMERALS

100 Circuit arrangement for electronic data processing
10 NV memory module
12 Memory module interface logic circuit
14 En-/decryption logic circuit of the memory module interface logic circuit 12
16 Key address generation unit of the en-/decryption logic circuit 14
18 Key register of the en-/decryption logic circuit 14
20 Code ROM module
22 Code ROM module interface logic circuit
24 Multiplexing unit of the code ROM module interface logic circuit 22
120*a* Address data "ADDR(a:0)" from the memory module interface logic circuit 12 to the memory module 10
120*r* Signal data "DOUT(d:0)" from the memory module 10 to the memory module interface logic circuit 12
120*w* Signal data "DIN(d:0)" from the memory module interface logic circuit 12 to the memory module 10
162*a* ROM key address data from the key address generation unit 16 to the multiplexing unit 24
220*a* Address data "A" from the multiplexing unit 24 to the code ROM module 20
220*r* ROM code data or ROM code bytes "DO" from the code ROM module 20 to the code ROM module interface logic circuit 22
C12*a* Address data "CPU NV addr" from the CPU to the memory module interface logic circuit 12
C12*r* Signal data "CPU NV read data" from the memory module interface logic circuit 12 to the CPU
C12*w* Signal data "CPU NV write data" from the CPU to the memory module interface logic circuit 12
C22*a* CPU ROM address data "CPU ROM addr" from the CPU to the multiplexing unit 24
C22*r* ROM code data "CPU ROM read data" from the code ROM module 20 to the CPU

The invention claimed is:

1. A method of retrieving encrypted data from a non-volatile memory for use by a microprocessor, the method comprising:
receiving, by a memory module interface logic circuit, an address of the non-volatile memory from a central processing unit (CPU);
generating, by the memory module interface logic circuit, a code read-only memory (ROM) address using the address of the non-volatile memory;
using the code ROM address to read a key code from a code ROM;
providing the key code to the memory module interface logic circuit;
reading, by the memory module interface logic circuit, encrypted data from the address of the non-volatile memory;
decrypting the encrypted data using the key code; and
providing the decrypted data to the CPU;
wherein reading the key code from the code ROM and reading encrypted data from the address of the non-volatile memory are performed, at least in part, in parallel.

2. The method of claim 1, wherein the code ROM only stores key codes.

3. A method of storing encrypted data into a non-volatile memory, the method comprising:
receiving, by a memory module interface logic circuit, an address of the non-volatile memory from a central processing unit (CPU);
generating, by the memory module interface logic circuit, a code read-only memory (ROM) address using the address of the non-volatile memory;
receiving data at the memory module interface logic circuit;
using the address of the non-volatile memory to read a key code from a code ROM;
providing the key code to the memory module interface logic circuit;
encrypting, by the memory module interface logic circuit, the data into encrypted data using the key code and writing, by the memory module interface logic circuit, the encrypted data to the address of the non-volatile memory;
wherein reading the key code from the code ROM and encrypting the data into encrypted data are performed, at least in part, in parallel.

4. A microcontroller comprising a security controller circuit, the security controller circuit comprising:
a non-volatile memory configured to store encrypted data;
a memory module interface logic circuit configured to read and write encrypted data to and from the non-volatile memory;
a code read-only memory (ROM) configured to store one or more key codes; and
a code ROM module interface logic circuit configured to:
receive an address for the code ROM from the memory module interface logic circuit;
use the address to read a key code from the code ROM; and
provide the key code to the memory module interface logic circuit;
wherein the memory module interface logic circuit is further configured to:
receive, from a central processing unit (CPU), an address of the non-volatile memory and data;
generate the address for the code ROM using the address of the non-volatile memory;
encrypt the data using the key code; and
store the encrypted data at the address of the non-volatile memory;
wherein, at least in part, the code ROM module interface logic circuit is configured to read out the key code and the memory module interface logic circuit is configured to encrypt the data into encrypted data in parallel.

5. The microcontroller of claim 4, wherein the address of the non-volatile memory is an encrypted address, and wherein the memory module interface logic circuit is further configured to:
decrypt the encrypted address using the key code; and
write the encrypted data to the decrypted address of the non-volatile memory.

6. The microcontroller of claim 4, further comprising a scrambling logic circuit configured to scramble bits of at least one of the address of the non-volatile memory or the data from the CPU.

7. The microcontroller of claim 6, wherein the scrambling logic circuit comprises:
  a permutation stage configured to permute bits of different value of at least one of the address of the non-volatile memory or the data from the CPU;
  an inversion stage configured to invert the values of the at least one of the address of the non-volatile memory or the data from the CPU, wherein the permutation stage and the inversion stage are configured to be controlled by scrambling pattern signals; and
  a decoding stage configured to obtain control signals for the permutation stage and the inversion stage from the scrambling pattern signals.

8. The microcontroller of claim 4, wherein the code ROM is configured to read the key code from the code ROM in accordance with a reset sequence, wherein the memory module interface logic circuit comprises a key register separate from the code ROM, and wherein the memory module interface logic circuit is further configured to store the key codes being read in the key register until a future time when the key codes are to be used to encrypt data.

9. A microcontroller comprising a security controller circuit, the security controller circuit comprising:
  a non-volatile memory configured to store encrypted data;
  a memory module interface logic circuit configured to read and write encrypted data to and from the non-volatile memory;
  a code read-only memory (ROM) configured to store one or more key codes; and
  a code ROM module interface logic circuit configured to:
    receive an address for the code ROM from the memory module interface logic circuit;
    use the address to read a key code from the code ROM; and
    provide the key code to the memory module interface logic circuit;
  wherein the memory module interface logic circuit is further configured to:
    receive data and an address of the non-volatile memory from a central processing unit (CPU);
    generate the address for the code ROM using the address of the non-volatile memory;
    read encrypted data from the address of the non-volatile memory;
    decrypt the encrypted data using the key code; and
    provide the decrypted data to the CPU;
  wherein, at least in part in parallel, the code ROM is configured to read out the key code and the memory module interface logic circuit is configured to encrypt the data into encrypted data.

10. The microcontroller of claim 9, wherein the address of the non-volatile memory received from the CPU is an encrypted address, and wherein the memory module interface logic circuit is further configured to:
  decrypt the encrypted address using the key code; and
  read the encrypted data from the decrypted address of the non-volatile memory.

11. The microcontroller of claim 9, further comprising a scrambling logic circuit configured to scramble bits of at least one of the data or the address of the non-volatile memory.

12. The microcontroller of claim 11, wherein the scrambling logic circuit comprises:
  a permutation stage configured to permute bits of different value of at least one of the data or the address of the non-volatile memory;
  an inversion stage configured to invert the values of the at least one of the data or the address of the non-volatile memory, wherein the permutation stage and the inversion stage are configured to be controlled by scrambling pattern signals; and
  a decoding stage configured to obtain control signals for the permutation stage and the inversion stage from the scrambling pattern signals.

13. The microcontroller of claim 9, wherein the code ROM module interface logic circuit is configured to read the key code from the code ROM in accordance with a reset sequence, wherein the memory module interface logic circuit comprises a key register separate from the code ROM, and wherein the memory module interface logic circuit is further configured to store the key codes being read in the key register until a future time when the key codes are to be used to decrypt data.

14. The method of claim 1, wherein the address of the non-volatile memory received from the CPU is an encrypted address, the method further comprising decrypting the encrypted address using the key code, and wherein said reading encrypted data comprises reading the encrypted data from the decrypted address of the non-volatile memory.

15. The method of claim 1, further comprising scrambling bits of at least one of the encrypted data or the address of the non-volatile memory using a scrambling logic circuit.

16. The method of claim 15, wherein said scrambling bits comprises:
  permuting bits of different value of at least one of the encrypted data or the address of the non-volatile memory;
  inverting the values of the at least one of the encrypted data or the address of the non-volatile memory, wherein said permuting and said inverting are controlled by scrambling pattern signals; and
  obtaining control signals for said permuting and said inverting from the scrambling pattern signals.

17. The method of claim 1, further comprising:
  reading the key code from the code ROM in accordance with a reset sequence; and
  storing the key codes being read in a key register until a future time when the key codes are to be used to decrypt data.

18. The method of claim 3, wherein the address of the non-volatile memory received from the CPU is an encrypted address, the method further comprising decrypting the encrypted address using the key code, and wherein said writing the encrypted data comprises writing the encrypted data to the decrypted address of the non-volatile memory.

19. The method of claim 3, further comprising scrambling bits of at least one of the data or the address of the non-volatile memory using a scrambling logic circuit.

20. The method of claim 19, wherein said scrambling bits comprises:
  permuting bits of different value of at least one of the data or the address of the non-volatile memory;
  inverting the values of the at least one of the data or the address of the non-volatile memory, wherein said permuting and said inverting are controlled by scrambling pattern signals; and
  obtaining control signals for the permuting the inverting from the scrambling pattern signals.

21. The method of claim 1, further comprising:
  reading the key code from the code ROM in accordance with a reset sequence; and
  storing the key codes being read in a key register until a future time when the key codes are to be used to encrypt data.

* * * * *